United States Patent
Schaer et al.

(10) Patent No.: US 7,337,037 B2
(45) Date of Patent: Feb. 26, 2008

(54) CONTROLLED WALL SAW AND METHOD FOR CONTROLLING THE WALL SAW

(75) Inventors: Roland Schaer, Grabs (CH); Christoph Würsch, Werdenberg (CH); Peter Hricko, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 160 days.

(21) Appl. No.: 11/359,797

(22) Filed: Feb. 21, 2006

(65) Prior Publication Data

US 2006/0189258 A1  Aug. 24, 2006

(30) Foreign Application Priority Data

Feb. 22, 2005  (DE) .................. 10 2005 000 013

(51) Int. Cl.
- G06F 19/00 (2006.01)
- B26D 1/14 (2006.01)
- E21C 25/00 (2006.01)

(52) U.S. Cl. .................. 700/160; 83/471.3; 125/13.01

(58) Field of Classification Search .............. 700/159, 700/160, 169, 170, 191–193; 83/471–473, 83/578; 125/12, 13.01, 14; 299/1.05, 1.5, 299/1.6–1.8, 36.1, 39.1–39.3, 42, 55, 56

See application file for complete search history.

(56) References Cited

U.S. PATENT DOCUMENTS

| | | | |
|---|---|---|---|
| 3,148,001 A | | 9/1964 | Johnson |
| 5,810,448 A | * | 9/1998 | Kingsley et al. ........... 299/39.3 |
| 5,887,579 A | | 3/1999 | Eriksson et al. |
| 5,921,228 A | * | 7/1999 | Watson ..................... 125/13.01 |
| 6,131,557 A | * | 10/2000 | Watson ..................... 125/13.01 |
| 6,484,711 B2 | * | 11/2002 | Acker et al. ............. 125/13.01 |
| 6,878,954 B2 | * | 4/2005 | Butler et al. ............. 250/559.3 |
| 2005/0262984 A1 | * | 12/2005 | Hetcher et al. ............ 83/471.3 |
| 2006/0000330 A1 | * | 1/2006 | Terashima et al. ......... 83/471.3 |
| 2006/0000331 A1 | * | 1/2006 | Ozawa et al. .............. 83/471.3 |
| 2006/0011036 A1 | * | 1/2006 | Ushiwata et al. ............. 83/581 |
| 2006/0144202 A1 | * | 7/2006 | Tokiwa et al. ................. 83/74 |
| 2006/0149497 A1 | * | 7/2006 | Takano et al. .............. 702/151 |
| 2007/0194617 A1 | * | 8/2007 | Moller et al. ................ 299/1.5 |

FOREIGN PATENT DOCUMENTS

| | | |
|---|---|---|
| DE | 19823756 | 12/1999 |
| WO | 02070219 | 9/2002 |

OTHER PUBLICATIONS

Search Report.

* cited by examiner

*Primary Examiner*—Maria N. Von Buhr
(74) *Attorney, Agent, or Firm*—Abelman, Frayne & Schwab

(57) ABSTRACT

A control wall saw includes a guide rail (2) securable on a to-be-cut wall (7), a saw head (3) displaceable along the guide rail (2), a rotary drive, a pivotally adjustable saw arm (4) on a radially end of which a rotatably driven, disc-shaped saw blade (5) is releasably mountable, a programmable control element (13) for controlling at least the saw head (3) and the saw arm (4) and having an input (14) and an output (15), a displacement sensor (16) for determining a position of the saw head (3) along the guide rail (2) and connected with the programmable control element (13), and a pivot angle sensor (17) for determining a pivot angle ($\alpha$) of the saw arm (4) relative to a longitudinal direction of the guide rail (2) and connected with the programmable control element (13).

14 Claims, 3 Drawing Sheets

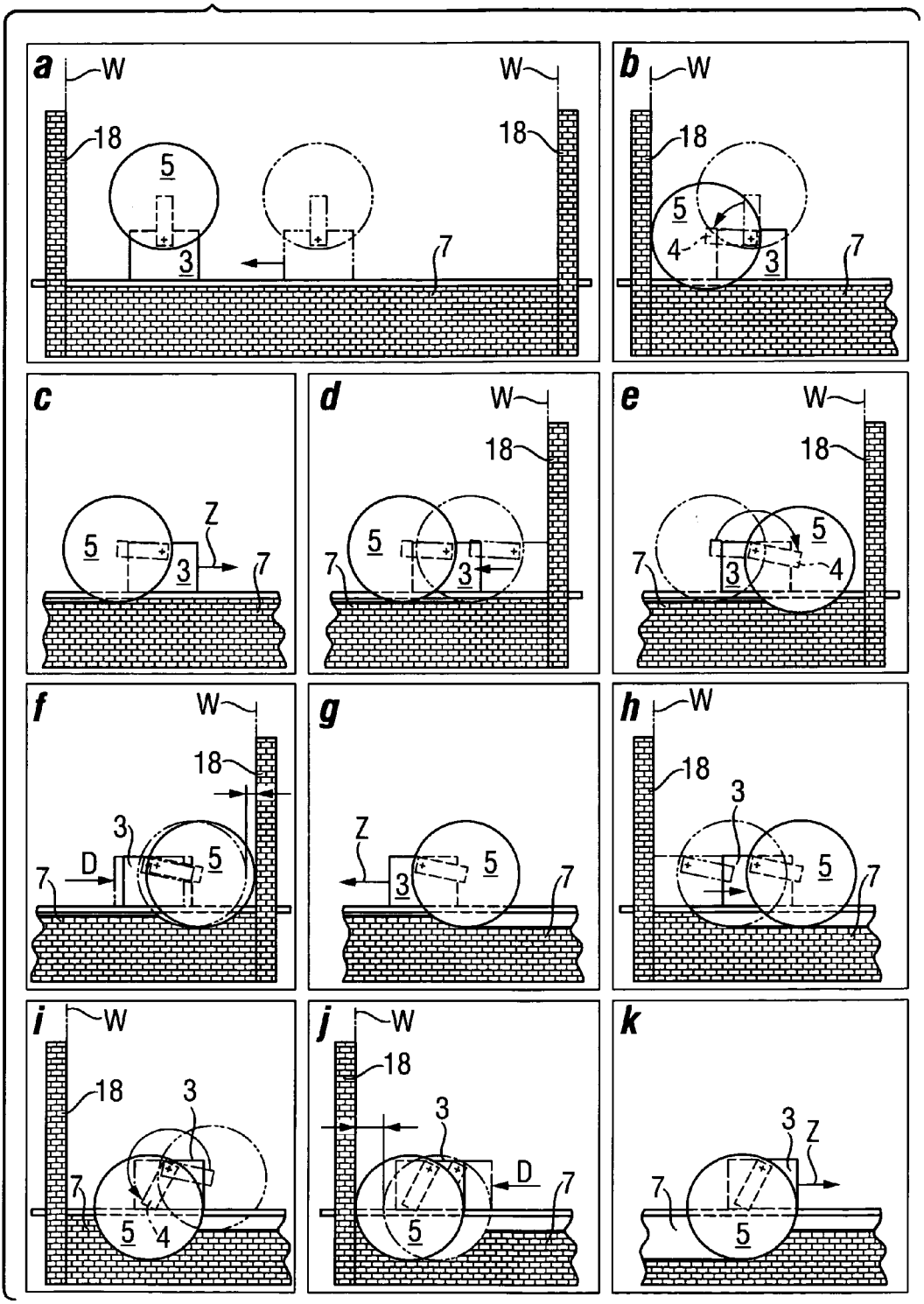

CONTROLLED WALL SAW AND METHOD FOR CONTROLLING THE WALL SAW

BACKGROUND OF THE INVENTION

1. Field of the Invention

The present invention relates to a controlled wall saw with a disc-shaped blade, which is securable on a to-be-cut wall, and to a controlling method for such a wall saw.

2. Description of the Prior Art

A wall saw with a disc-shaped blade, which is securable on a to-be-cut wall and is designed for cutting stone and the like, is used in a constructional industry to cut out an opening in a wall in several offset steps by separating appropriate wall pieces. Usually, the to-be-cut wall is bordered by adjacent walls, wherein "wall" also means floor and ceiling. As a rotary drive for the saw blade, which is arranged in the saw head, a heavy-duty hydraulic motor or electric motor is used. The motor is connected by respective conduits or conductors with a corresponding separate power source.

U.S. Pat. No. 5,887,579 discloses a wall saw that includes a guide rail securable on a to-be-cut wall, a saw head displaceable along the guide rail, a rotary drive, and a pivotally adjustable saw arm on a radially end of which a rotatably driven, disc-shaped saw blade is releasably mountable. Such wall saws, to which the present invention is limited, have the following degrees of freedom, which are controlled by the user, namely, rotation of the saw blade, pivot angle of the saw arm, and longitudinal displacement of the saw head. In addition, a saw blade diameter, which defines a parameter, can be manually changed by changing the disc-shaped saw blade. However, at least partially automatic sawing process is not disclosed.

German Publication DE 19737617 discloses a controlled wall saw securable directly on a to-be-cut wall and including control electronic and a portable remote control system with which a user can manually remotely control the rotary drive and the longitudinal displacement. The hydraulic drive is electrically controlled, over a program-controlled hydraulic valve, by a step motor and an end switch. However, the foregoing control means does not provide for at least partially automatic process. Rather, the user manually directly controls the sawing process using the remote control system and actively following the sawing process.

Also known are stationary program-controlled stone cutting machines for a complete automatic cutting of compact rock pieces. Thus, German Publication DE 4006668 discloses a rock cutting machine in which to-be-cut rock pieces are placed on a working table in a working region of a long guide rail in which there are provided displacement sensors and a saw blade displaceable in many directions. According to a sawing process which is programmed in a computer, the saw blade performs reciprocating repeated movements offset by a cut depth, with the optimal reversing points being calculated based on a profile of a rock piece determined by distance measuring sensors. However, the controlled process of DE 4006668 is not applicable to wall saws securable on to-be-cut walls. In addition, during cutting the rock piece, no obstacles in form, e.g., side walls, should be taken into consideration.

Accordingly, an object of the present invention is a program-controlled wall saw and an associated controlling process for effecting at least partially automatic sawing process.

SUMMARY OF THE INVENTION

This and other objects of the present invention, which will become apparent hereinafter, are achieved by providing a controlled wall saw including a guide rail securable on a to-be-cut wall, a saw head displaceable along the guide rail, a rotary drive, a pivotally adjustable saw arm on a radially end of which a rotatably driven, disc-shaped saw blade is releasably mountable, programmable control means for controlling at least the saw head and the saw arm and having input means and output means, a displacement sensor for determining a position of the saw head along the guide rail and connected with the programmable control means, and a pivot angle sensor for determining a pivot angle of the saw arm relative to a longitudinal direction of the guide rail and connected with the programmable control means.

In addition to a manual control, the sawing process of a controlled wall saw is at least partially automatized by using a control program that is realized with programmable control means, displacement sensor, and pivot angle sensor. The user is freed from a direct control and can rather attend to control of at least partially automatic sawing process.

Advantageously, the output means is formed as a graphic display, whereby the sawing process can be graphically simulated and be followed schematically.

The object or objects of the present invention is also achieved with a controlling method that includes effecting, in a manual preparation process, fixation of the guide rail on a to-be-cut wall, positioning of the saw blade in an initial position, and inputting, over the input means, at least a saw blade diameter, two inflexion points, and calculating, based on input data, a rotational speed, a displacement speed, and an incremental cut depth. According to the invention in a later sawing process which is completely program-controlled by programmable control means, it is effected in a first step, pivoting the saw arm by the incremental cut depth in a direction of the to-be-cut wall, in a second step, displacing the saw head along the guide rail with the displacement speed in a first direction toward first inflexion point, and in a third step, displacing the saw head along the guide rail in a second direction opposite the first direction and toward the second inflexion point. Thereafter, running at least one time of a step sequence encompassing at least the first step, the second step, and the third step takes place.

The periodically repeated step sequence of a sawing process, which is completely program-controlled by programmable control means, of a controlled wall saw permits to free the user from routine activities, and the user can completely concentrate on the monitoring the at least partially automatic sawing process.

Advantageously, the first direction is a pulling direction that forms an obtuse angle with the saw arm, and the second direction is a pushing direction opposite the pulling direction, with the sawing being effected, preferably, in the stable pulling direction.

Advantageously, at least in the first step, a rotational direction of the saw blade is so oriented that in the cut wall, a tangential cutting direction is oriented toward the pulling direction. Thereby, a tensile stress is produced in the saw arm which contributes to a stable guidance of the saw blade and, thereby, leads to a clean narrow cut.

Advantageously, between the second step and the third step, a further first step is effected, so that a reverse direction contributes to the advance of the saw, which increases the saw speed. Advantageously, before that, the saw arm is pivoted, whereby, both the first and second directions produce a pulling direction. It is also advantageous when after being pivoted, together with the saw arm, the saw blade is pushed to the next inflexion point in the pushing direction. Thereby, a precise beginning of the cut is achieved.

Advantageously, in the manual preparation process, an end depth has been input over the input means. After the end depth has been processed in the program-controlled sawing process, the saw is returned to its initial position, and the automatic sawing process ends.

Advantageously, during the manual preparation process, at least one inflexion point is defined, by using the input means, as a one-side obstacle, the passing over of which is interpreted as being impermissible in program-controlled sawing process which is completely controlled by the programmable control means. Thereby, the program-control insures that no displacement of the saw blade and/or the saw head would result in the contact of the saw blade and/or the saw head with the obstacle.

Advantageously, with only one inflexion point being defined as an obstacle, the saw arm is always oriented toward the obstacle. Thereby, pivoting the saw arm as it approaches the obstacle is not necessary, and the sawing process is shortened.

Alternatively, with both inflexion points being defined as an obstacle, shortly before the saw head approaches the obstacle, the saw head is set back sufficiently far, and the saw arm is pivoted in a direction toward the obstacle over a free half-space.

Thereby, the saw arm necessarily approaches the obstacle before the saw head, and a largest portion of the cut is always effected in the pulling direction.

Advantageously, upon input of a topological/practical limitation that cannot be solved by the programmable control means, a user is advised by output means that the saw blade should be replaced with a saw blade having another diameter. Advantageously, the optimal dimension of the new diameter of the saw blade is calculated and output. This makes possible to form deeper incisions, in particular, between two side walls.

The associated algorithm of the programmable control means defines the control process for the at least partially automatic sawing process for a microcontroller and usually is already programmed. Thereby, this control process can be repeated, without intervention of the user.

Advantageously, in the manual preparation process, an inflexion point is not defined as an obstacle but rather as a threshold inflexion point that can be changed by the programmable control means and that permits an overpassing at a tool-side wall. In this case, it is calculated by the programmable control means, e.g., by a simple trigonometrical function, as a function of the actual cut depth and the saw blade diameter. Thereby, at the end of the sawing process, the cut ends with the end depth exactly at the desire end, i.e., at the threshold inflexion point, in particular, at the hidden side of the wall opposite the tool-side wall side.

Naturally, the definition of an inflexion point as an obstacle is also possible when physically no obstacle exists. Thereby, it can be achieved that the pushing mode ends after each pivoting of the saw arm. This insures obtaining of a clean end of the cut.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 3(a-k) a flow chart of a sawing process between two side walls.

DETAILED DESCRIPTION OF THE PREFERRED EMBODIMENT

Figure 1:
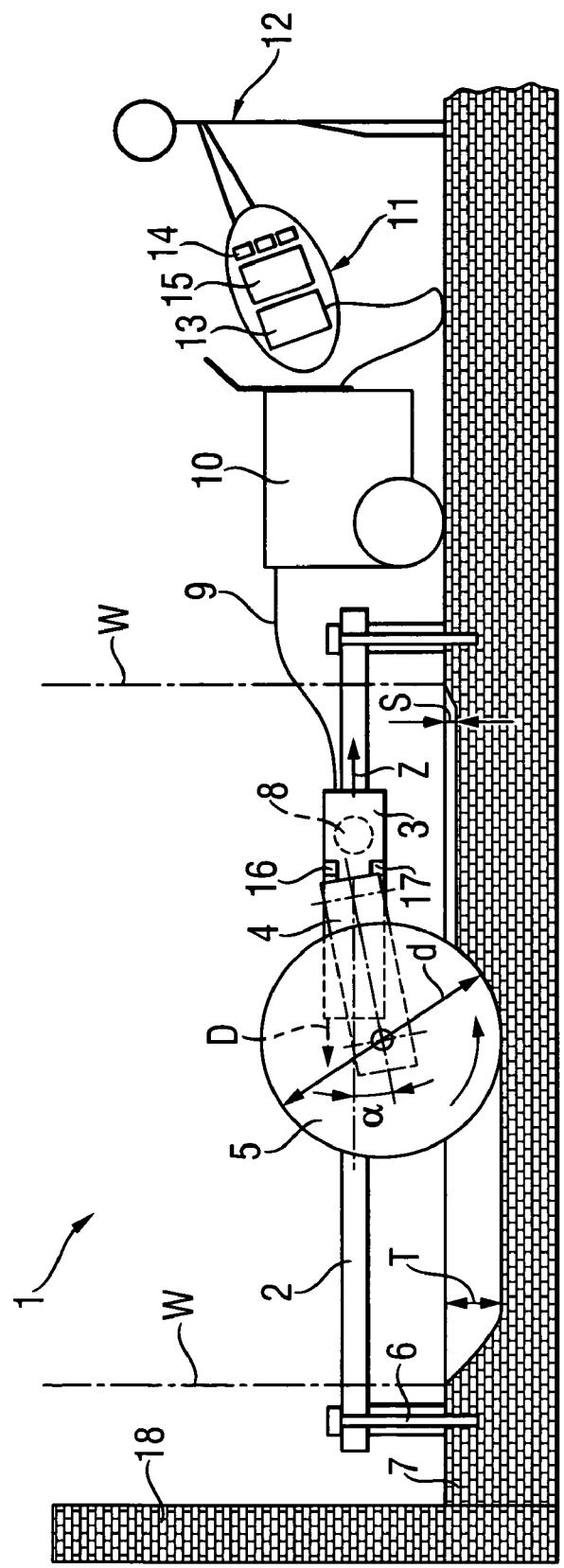
FIG. 1 a side view of a wall saw according to the present invention.

A controllable wall saw 1 according to the present invention, which is shown in FIG. 1, includes a saw head 3 displaceable along a guide rail 2, and a pivotable saw arm 4 at a radial end of which a disc-shaped saw blade is rotatably and releasably mounted. The guide rail 2 is secured with an anchor 6 directly on a to-be-cut wall 7 that is limited by an adjacent wall 18 which extends perpendicular thereto. A rotary drive 8 of the saw blade 5, which is arranged in the saw head 3 includes a heavy-duty electric motor that is connected by a flexible conductor 9 with a separate, portable power supply 10. The power supply 10 is connected with a remote control system 11 operated by a saw user 12. The remote control system 11 includes controlled programmable control means 13 in form of a microcontroller provided with input means 14 in form of a keyboard, and output means 15 in form of a graphic display. The programmable control means 13 is connected with a displacement sensor 16 for determining a position of the saw head 3 along the guide rail 2, and a pivot angle sensor 17 for determining the pivot angle α of the saw arm 4 relative to a longitudinal extent of the guide rail 2. The saw blade 5, which has a diameter d, is reciprocatingly displaced between two inflexion points W with incremental cut depths S until an end depth T in the wall is reached. To this end, the saw blade 5 is displaced by the saw head 3 and the saw arm 4 in pull direction Z or in push direction D along the guide rail 2.

Figure 2:
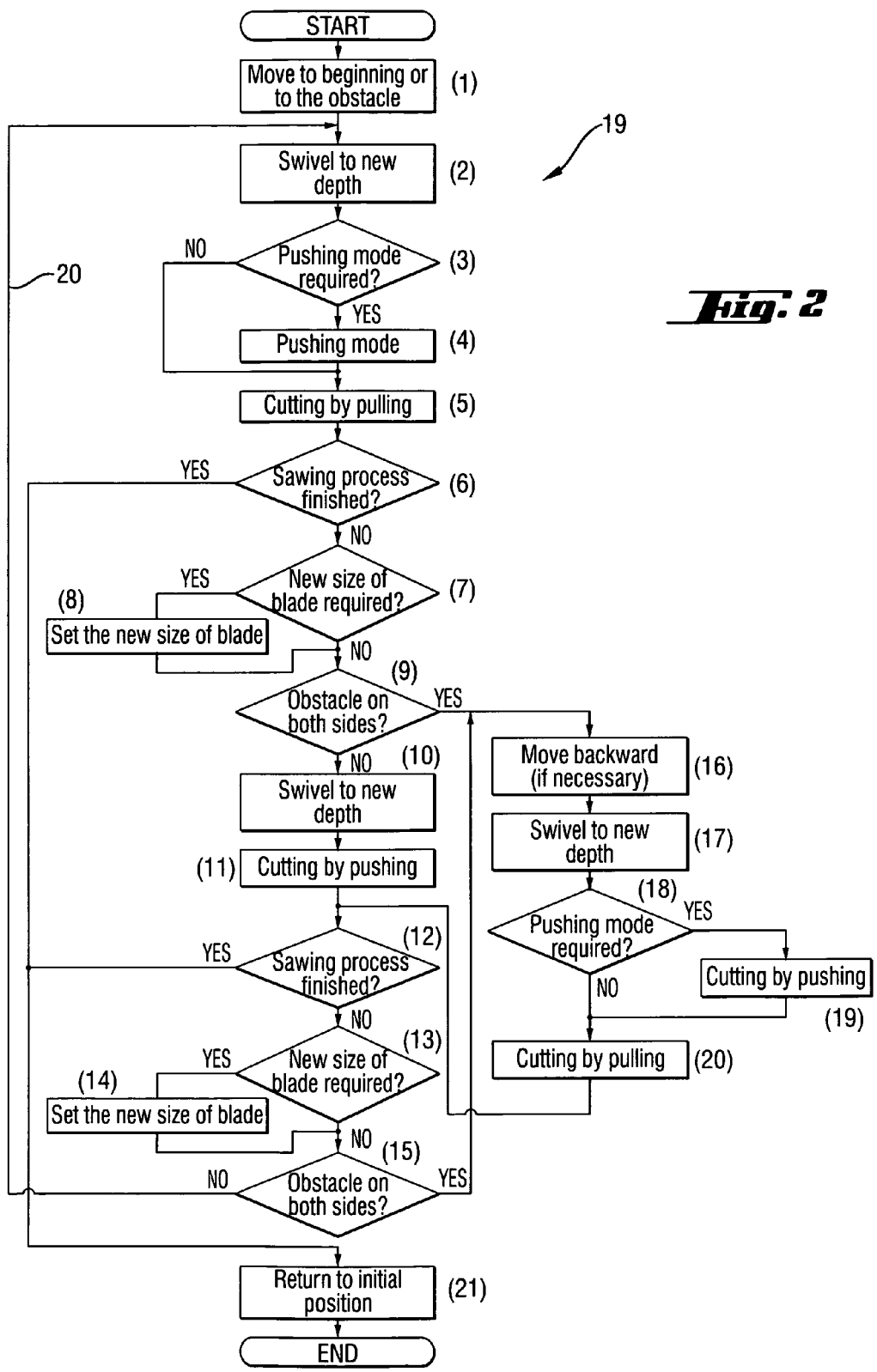
FIG. 2 an algorithm of a control process of a sawing process with separate modules.

FIG. 2 shows a flow chart of a program of a programming algorithm 19 of the programmable control means 13 according to FIG. 1, which after a manual preparation process, is processed by programmable control means in a subsequent program-controlled, at least partially automatic sawing process. The algorithm 19, which is directionally processed from START to END by separate modules, consists of modules (1) to (15), (16) to (20), and a last processed module (21) which all are processed chronologically one after another according to the module number #. As an exception from the process, there take place in the module (3) a conditional jump to the module (5), in the module (6) a conditional jump to the module (121), in module (7) a conditional jump to the module (9), in the module (9) a conditional jump to the module (16), in the module (12) a conditional jump to the module (21), in the module (13) a conditional jump to the module (15), in the module (15) a conditional jump to the module (2) or the module (16), in the module (18) a conditional jump to the module (20), and in the module (20) an unconditional jump to the module (12). Only an essential function of the modules having respective #s will be described below.

Module (1): move to beginning or to the obstacle

Module (2): module (10), module (17): swivel to new depth

Module (3): module (18): pushing mode required?

Module (4): pushing mode.

Module (5), module (20): cutting by pulling.

Module (6), module (12): sawing process finished?
Module (7), module (13): new size of blade required?
Module (8), module (14): set the new size of blade.
Module (9), module (15): obstacle on both sides?
Module (11), module (19): cutting by pushing.
Module (16): move backward (if necessary).
Module (21): return to initial position.

Preliminarily, during a manual preparation process, the guide rail 2 is secured directly on the wall 7, and the saw blade is positioned in the initial position. In addition, using the input means, the user inputs the blade diameter, the two inflexion points, their optional definition as obstacles or threshold inflexion points, end depth, sawing mode (sawing only in the pulling direction or in the pulling/pushing direction), and further parameters such as the wall material and the reinforcement thickness. Based on the input data, the programmable control means 11 determines the rotational speed of the saw blade 5, the displacement speed thereof, and an incremental cut depth. In accordance with the algorithm 19, which consists of separate modules (#), of the sawing process, after a suitable initial positioning (FIG. 3a) has taken place in the module (1), in a first step in the module (2), the saw arm 4 is pivoted in the direction of the wall 7 by the incremental depth (FIG. 3b). In the second step, in module (5), the saw head 3 is pushed with the predetermined displacement speed along the guide rail 2 in a pulling direction, which is defined by an obtuse angle that the head 3 forms with the saw arm 5, to the first inflexion point (FIG. 3a). In the third step in the module (11), the saw head 3 is displaced along the guide rail 2 in the pulling direction opposite the pushing direction toward the second inflexion point (FIG. 3b). Following the return jump 20, a step sequence, which encompasses the first step in the module (2), the second step in the module (5), and the third step in the module (11) is periodically run several times. At that, in the second step in the module (5) or the module (20) and the third step in the module (11) or the module (19), the rotational direction of the saw blade 5 is so oriented by the programmable control means 11 that in the wall 7, the tangential cutting direction is adapted to the pulling direction (FIG. 1). Between the second step in the module (5) or the module (20) and the third step in the module (11) or the module (19), for additional pivoting by the incremental cut depth, a further step, corresponding to the first step in module (2), is effected in the module (10) or the module (17). After completion of the program-controlled sawing process, which is completely controlled by the programmable control means 11, and upon completion of which an end depth, which was input with the input means in the preliminary manual preparation process and which was tested in the module (6) or the module (12), has been reached, in the last step in the module (21), the saw blade 5 is returned to its initial position. If during the manual preparation process, the inflexion point was defined as an obstacle, either in the module (3) or the module (18), by calculating the distances from the saw head 3 to the obstacle, which are obtained during the reciprocating movement of the saw blade the contact of which with the obstacle is not permissible, it is insured, by changing the sawing mode (pulling direction <==> pushing direction), that the saw blade and/or the saw head does not touch the obstacle at any of displacement conditions. Thus, with an inflexion point being defined as an obstacle, the saw arm is oriented toward the obstacle, so that no pivoting of the saw arm is necessary when it approaches the obstacle. Alternatively, with two inflexion points being defined as an obstacle in the module (9) or the module (15), shortly before the saw head approaches one of the obstacles, in the module (16), the saw head is put back by a sufficient distance, and the saw arm is pivoted over a free half space in a direction of the obstacle, so that the saw arm necessarily approaches the obstacle before the saw head. Upon entry of a topological/practical limitation in the sawing process, which was verified in the module (7) or the module (13) and which cannot be dealt with by the programmable control means in the module (8) or the module (14), the user is advised through the output means to replace the saw blade with a saw blade having another diameter. Advantageously, the optimal diameter is calculated and is output, so that deeper incisions, in particular between two side walls, become possible.

FIGS. 3(a-k) illustrate a saw process between tow side walls 18 which is program-controlled completely by the programmable control means. During the preparation process, the side walls 18 are input as inflexion point W and are defined as obstacles. According to FIG. 3a, the saw head 3 with a saw blade 5, which is lifted off the to-be-cut wall 7, is displaced to its initial position. In FIG. 3b, the saw blade 5 is displaced into the wall 7 as a result of a pivotal movement of the saw arm 4. In FIG. 3c, the saw head 3 is pushed in the direction Z. In FIG. 3d, upon approaching of the saw head 3 to the side wall 18, the saw head 3 is displaced back. In FIG. 3e, the saw arm 4 is pivoted over a free half space toward the side wall 18. In FIG. 3f, the remaining distance between the saw blade 5 and the side wall 18 is sawed in the pushing direction D. In FIG. 3g, the saw head 3 is displaced in the pulling direction Z. In FIG. 3h, upon approaching of the saw head 3 to the side wall 18, the saw head 3 is set back. In FIG. 3i, the saw arm 4 is pivoted toward the side wall 18, and the saw blade 5 is displaced deeper into the wall 7. In FIG. 3j, the remaining distance between the saw blade 5 and the side wall 18 is sawed in the pushing direction D. In FIG. 3k, the saw head 3 is displaced in the pulling direction Z. Starting from the step shown in FIG. 3d, the process is repeated several times until the end depth is reached. Then, the saw head 3 is displaced in its initial position shown in FIG. 3a.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A controlled wall saw, comprising a guide rail (2) securable on a to-be-cut wall (7); a saw head (3) displaceable along the guide rail (2); a rotary drive; a pivotally adjustable saw arm (4) on a radially end of which a rotatably driven, disc-shaped saw blade (5) is releasably mountable; programmable control means (13) for controlling at least the saw head (3) and the saw arm (4) and having input means (14) and output means (15); a displacement sensor (16) for determining a position of the saw head (3) along the guide rail (2) and connected with the programmable control means (13); and a pivot angle sensor (17) for determining a pivot angle ($\alpha$) of the saw arm (4) relative to a longitudinal direction of the guide rail (2) and connected with the programmable control means (13).

2. A controlled wall saw according to claim 1, wherein the output means (15) is formed as a graphic display.

3. A method of controlling a controllable wall saw (1) that includes a guide rail (2) securable on a to-be-cut wall (7), a saw head (3) displaceable along the guide rail (2), a rotary drive, and a pivotally adjustable saw arm (4) on a radially end of which a rotatably driven, disc-shaped saw blade is releasably mountable, the method comprising the steps of effecting, in a manual preparation process, fixation of the guide rail (2) on a to-be-cut wall (7), positioning of the saw blade (5) in an initial position, and inputting, over the input means (14), at least a saw blade diameter (d), two inflexion points (W), and calculating, based on input data, a rotational speed, a displacement speed, and an incremental cut depth (S); and effecting, in a later sawing process which is completely program-controlled by programmable control means (13), in a first step, pivoting the saw arm (4) by the incremental cut depth (S) in a direction of the to-be-cut wall (7), in a second step, displacing the saw head (3) along the guide rail (2) with the displacement speed in a first direction toward first inflexion point (W), and in a third step, displacing the saw head (3) along the guide rail (2) in a second direction opposite the first direction and toward the second inflexion point (W); and thereafter, running at least one time a step sequence encompassing at least the first step, the second step, and the third step.

4. A controlling method according to claim 3, wherein the first direction is a pulling direction (Z) that forms an obtuse angle with the saw arm (4), and the second direction is a pushing direction (D).

5. A controlling method according to claim 4, wherein in the program-controlled sawing process, at least in the first step, a rotational direction of the saw blade (5) is so oriented that in the cut wall (7), a tangential cutting direction is oriented toward the pulling direction (Z).

6. A controlling method according to claim 3, wherein in the program-controlled sawing process, a further first step is effected between the second step and the third step.

7. A controlling method according to claim 3, wherein in the program-controlled sawing process, after processing an end depth (T), which was input over the input means (14) in the manual preparation process, the saw head (3) is displaced back into an initial position thereof.

8. A controlling method according to claim 3, wherein in the program-controlled sawing process, passing over of at least one inflexion point (W), which was defined in the manual preparation process over the input means (14) as an obstacle, is not permissible.

9. A controlling method according to claim 3, wherein in the program-controlled sawing process, with one inflexion point (W) defined as an obstacle, the saw arm (4) is always oriented toward the obstacle.

10. A controlling method according to claim 3, wherein in the program-controlled sawing process, with both inflexion points (W) being defined as an obstacle, shortly before the saw head (3) approaches the obstacle, the saw head (3) is set back sufficiently far, and the saw arm (4) is pivoted in a direction toward the obstacle over a free half-space.

11. A controlling method according to claim 3, wherein in the program-controlled sawing process, upon input of a topological/practical limitation that cannot be solved by the programmable control means (13), a user is advised by output means (15) that the saw blade (5) should be replaced with a saw blade having another diameter (d).

12. A controlling method according to claim 11, wherein an optimal dimension of the another diameter is calculated and output.

13. A controlling method according to claim 3, wherein in the manual preparation process, an inflexion point (W) is not defined as an obstacle but as a threshold inflexion point changeable by the programmable control means (13) and permitting an overpassing at a tool-side wall side, and wherein the programmable control means (13) calculates the overpassing as a function of an actual cut depth and a diameter (d) of the saw blade (5).

14. Programmable control means for controlling a sawing process of a wall saw (1) that includes a guide rail securable on a to-be-cut wall, a saw head displaceable along the guide rail, a rotary drive; a pivotally adjustable saw arm on a radially end of which a rotatably driven, disc-shaped saw blade is releasably mountable, the programmable control means comprising an algorithm for effecting, in a first step, pivoting the saw arm (4) by incremental cut depth (S) in a direction of the to-e-cut wall (7), in a second step, displacing the saw head (3) along the guide rail (2) with the displacement speed in a first direction toward first inflexion point (w), and in a third step, displacing the saw head (3) along the guide rail (2) in a second direction opposite the first direction and toward the second inflexion point (W); and thereafter, running at least one time a step sequence encompassing at least the first step, the second step, and the third step.

* * * * *